Figure 1:
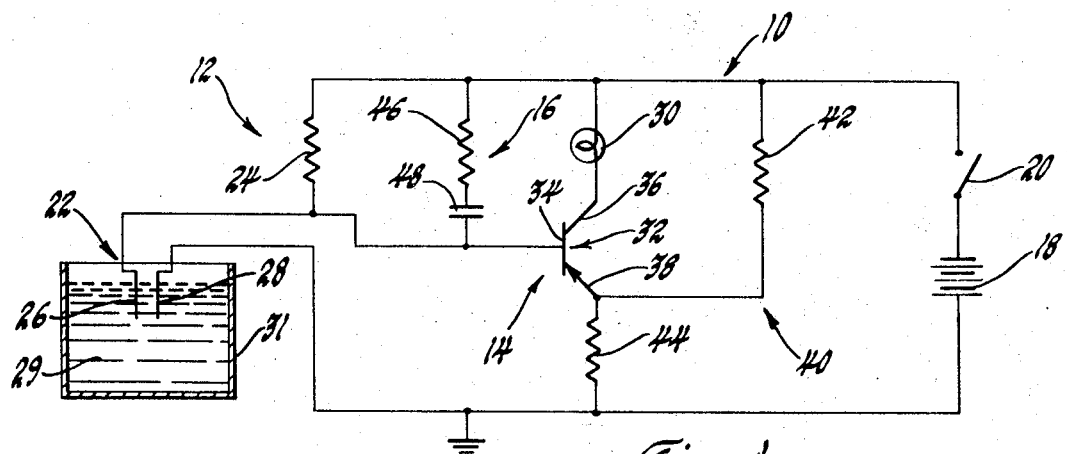

United States Patent

[11] 3,626,400

| | | | |
|---|---|---|---|
| [72] | Inventor | Trevor Bates Houghton Regis near Dunstable, England | |
| [21] | Appl. No. | 765,905 | |
| [22] | Filed | Oct. 8, 1968 | |
| [45] | Patented | Dec. 7, 1971 | |
| [73] | Assignee | General Motors Corporation Detroit, Mich. | |
| [32] | Priority | Oct. 18, 1967 | |
| [33] | | Great Britain | |
| [31] | | 47,424/67 | |

[54] SELF-CHECKING FLUID LEVEL INDICATORS
8 Claims, 3 Drawing Figs.

[52] U.S. Cl. .................................................. 340/244 C, 340/411
[51] Int. Cl. ...................................................... G08b 21/00
[50] Field of Search .......................................... 340/244 C, 411, 410, 214, 244 C; 307/290; 200/61.05; 73/304

[56] References Cited
UNITED STATES PATENTS

| | | | | |
|---|---|---|---|---|
| 2,782,401 | 2/1957 | Boddy | | 340/411 X |
| 3,149,319 | 9/1964 | Messmer et al. | | 340/411 X |
| 3,350,710 | 10/1967 | Bridges | | 340/59 X |
| 3,498,131 | 3/1970 | Rickey | | 340/244 |
| 838,823 | 12/1906 | Thomson | | 340/244 C |
| 2,928,037 | 3/1960 | Lawrence | | 340/244 UX |
| 3,059,443 | 10/1962 | Garner | | 340/244 X |
| 3,246,517 | 4/1966 | Malkiewicz | | 340/244 A X |
| 3,251,654 | 5/1966 | Palmer | | 340/237 X |
| 3,335,334 | 8/1967 | Albisser | | 340/244 C X |
| 3,461,446 | 8/1969 | Sergeant | | 340/244 |

FOREIGN PATENTS

| | | | |
|---|---|---|---|
| 1,389,869 | 1/1965 | France | 340/244 C |

Primary Examiner—John W. Caldwell
Assistant Examiner—Daniel Myer
Attorneys—Jean L. Carpenter and Paul Fitzpatrick ABSTRACT: A fluid level detector comprising a probe circuit for the detection of fluid at a fluid level of interest, an indicator circuit for indicating the detection of fluid at the fluid level of interest, and a timer circuit operative upon initial energization of the detector so as to energize the indicator circuit for a predetermined time to provide a check of the detector operativeness.

PATENTED DEC 7 1971

3,626,400

INVENTOR.
Trevor Bates
BY
Hugh L. Fisher
ATTORNEY

SELF-CHECKING FLUID LEVEL INDICATORS

This invention pertains to improvements in fluid level detectors.

Many types of fluid level detectors have been proposed in the past. These detectors have utilized diverse types of probes positionable in a reservoir at a fluid level to be detected. For example, a fluid level detector utilized to indicate when the fluid in a vehicle radiator falls below a certain level may incorporate a two-electrode probe, the electrical connection between the electrodes being completed by the electrically conductive fluid in the radiator. Another probe utilized in the prior art is a thermistor probe positioned so as to be immersed in the fluid being detected when the fluid is above a certain level. A thermistor probe is usually utilized to detect the level of a dense fluid, such as a liquid, as the fluid is employed to cool the thermistor when the thermistor is immersed in the fluid. When the thermistor is not so immersed, it is heated internally by an electrical current, causing a change in the thermistor impedance. The change in the thermistor impedance is sensed as an indication of the fluid level. The liquid level detectors employing these and other probes are similar insofar as they provide an indicator circuit responsive to a probe to advise an observer of the fluid level in a reservoir. However, most of these prior art detectors do not provide a means by which the detector operativeness can be checked. When a malfunction occurs in these prior art detectors, the fluid may fall to a level below the level of the probe without the observer being so advised. This is especially the case in detectors in which the lack of a signal is meant to indicate the fluid sensed is at the proper level.

To eliminate this problem, a fluid level detector is proposed which has a provision for checking the detector operativeness so as to indicate the presence of a malfunction to an observer prior to his placing reliance upon an incorrect indication of fluid level.

It is, therefore, an object of the invention to provide a fluid level detector having a provision for checking the detector operativeness automatically upon energization of the detector.

It is also an object of this invention to provide a timer circuit which is easily combined with a fluid level detector having an indicator device whereby the indicator device may be energized for a time determined by the timer circuit upon energization of the detector so as to provide a check of the detector operativeness.

Another object of this invention is to provide a fluid level detector having an RC timer circuit which operates an indicator device while the capacitor is being charged upon initial energization of the detector so as to provide a check of the detector operativeness.

An additional object of this invention is to provide a fluid level detector which utilizes a timing circuit to energize an indicator device so as to provide a check of the detector operativeness prior to using the indicator device as part of an oscillator circuit to provide an intermittent indication of the fluid level.

A still more specific object of this invention is to provide a fluid level detector having a provision for checking the detector operativeness and which utilizes regenerative feedback means so as to decrease the detector response time.

Figure 2:
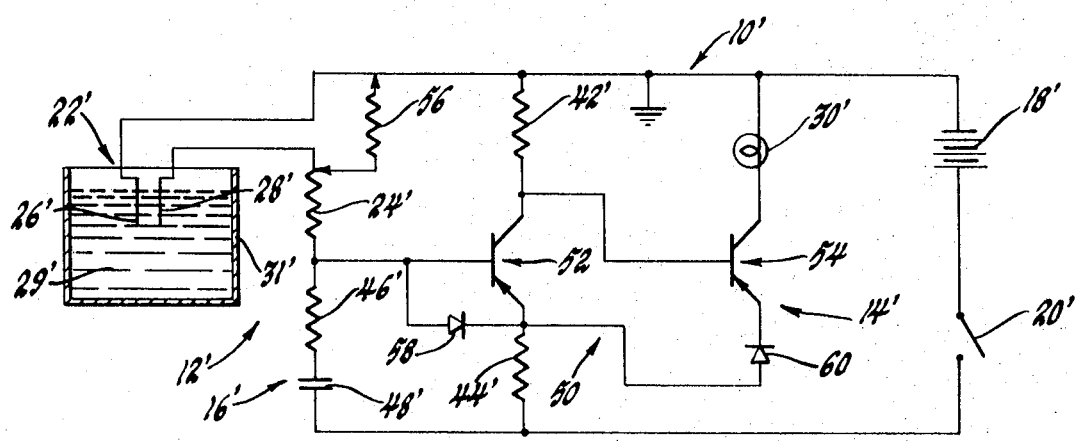
Figure 3:
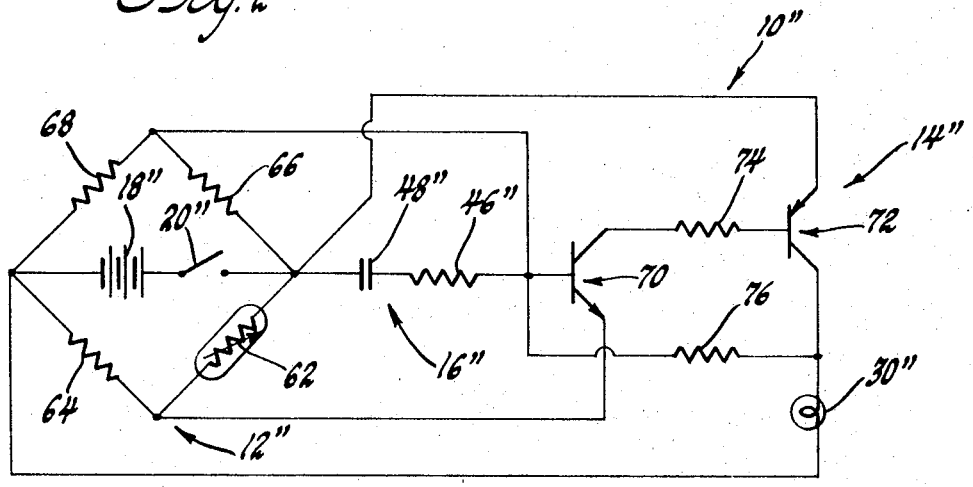

These and other objects and advantages of this invention will be apparent from the following description and illustrations, in which:

FIG. 1 is a schematic diagram of a detector circuit incorporating a check of the detector operativeness according to the principles of this invention;

FIG. 2 discloses an embodiment of the detector in FIG. 1 which may be modified to provide an intermittent energization of an indicator device; and FIG. 3 discloses the detector of FIG. 1 adapted to use a thermistor probe and to use regenerative feedback to decrease the detector response time.

Referring now to FIG. 1, a fluid level detector 10 is shown to be comprised of a probe circuit 12, an indicator circuit 14 which is responsive to the probe circuit 12, and a timer circuit 16 which energizes the indicator circuit 14 for a predetermined time upon initial energization of the detector 10. In a typical vehicle application, the energization of the detector 10 is achieved by connecting a vehicle battery 18 to the detector 10 through an ignition switch 20.

The probe circuit 12 is shown to be comprised of a probe 22 and a resistor 24. The probe 22 utilized in the illustrated embodiment is comprised of a pair of terminals 26 and 28. Under normal conditions the terminals 26 and 28 are immersed in a conductive fluid 29 in a reservoir 31 so as to provide a very low voltage drop across the probe 22. When the level of the conductive fluid 29 falls below the terminals 26 and 28, the probe 22 presents an infinite impedance to the detector 10 and virtually the entire voltage of the battery 18 is applied across the probe 22.

The voltage across the probe 22 is sensed by the indicator circuit 14. The indicator circuit 14 is comprised of an indicator device 30, herein shown to be an indicator lamp, a transistor 32 having a base 34, a collector 36, and an emitter 38, and a voltage divider 40 comprised of a pair of resistors 42 and 44. While a PNP-transistor is utilized in the illustrated embodiment, it will be understood by those skilled in the art that other circuit elements, such as PNP-transistors, may readily be utilized without departing from the spirit of the invention. The voltage divider 40 is powered directly by the battery 18 and is used to establish the potential at the emitter 38 of the transistor 32. The voltage across the probe 22 is sensed by the transistor base 34. When the probe 22 is immersed in the conductive fluid 29, the transistor base 34 is almost at ground potential due to the small impedance presented by the probe 22. The base-emitter junction of the transistor 32 is thereby reverse biased and the transistor 32 is kept in a nonconductive state so long as the conductive fluid 29 is present between the probe terminals 26 and 28. Should the conductive fluid 29 fall below the level of the probe 22, an open circuit is presented between the probe terminals 26 and 28. Since the impedance of the probe 22 would then be considerably greater than the impedance of the resistor 24, the transistor base 34 would assume a voltage more negative than the transistor emitter 38,. The base-emitter junction of the transistor 32 would thus be forward biased, turning on the transistor 32 and energizing the indicator device 30. The indicator device 30 is thus energized whenever the probe 22 is not immersed in the conductive fluid 29.

The timer circuit 16 is comprised of a resistor 46 and a capacitor 48. The detector 10 is initially energized upon closure of the switch 20, after which the timer circuit 16 presents a low impedance between the transistor base 34 and the ignition switch 20. The timer circuit 16 thus provides a path for the transistor 32 base current upon the initial energization of the detector 10. The base current thus provided causes the transistor 32 to turn on for a predetermined time while the capacitor 48 is being charged. The indicator device 30 is also energized for the predetermined time and may be utilized to provide a check of the detector 10 operativeness, as most failures of any circuit in the detector 10 will result in not permitting the indicator device 30 to become energized. Failure of the indicator device 30 to become energized during the predetermined time indicates the presence of a malfunction in the detector 10. The duration of the check of the detector 10 operativeness is determined by the time constant of the resistor 46 and the capacitor 48. When the capacitor 48 has become charged and the probe 22 is immersed in the conductive fluid 29, the base-emitter junction of the transistor 32 is again reverse biased, turning off the detector 10. If the probe 22 is not immersed in the conductive fluid 29 when the capacitor 48 has become charged, the indicator device 30 will remain energized to indicate such a condition.

Referring now to FIG. 2, it is seen that the detector 10' has been modified so as to include the timer circuit 16' in the probe circuit 12' and to provide a Schmitt trigger 50, comprised of a pair of transistors 52 and 54, in the indicator circuit 14'. The probe circuit 12' in FIG. 2 is comprised of the probe 22' the resistor 24', and the timer circuit 16'. A shunt resistor 56, the purpose of which will be explained later, may also be provided. The indicator circuit 14' is comprised of the resistors 42' and 44', the indicator device 30', the Schmitt trigger 50. The Schmitt trigger 50 may include a pair of diodes 58 and 60, the purpose of which will also be explained later.

When the probe 22' is immersed in the conductive fluid 29' the potential across the resistor 24' and the probe 22' is very small due to the low impedance of the probe 22'. The base-emitter junction of the transistor 52 is thus forward biased, rendering the transistor 52 conductive and applying a positive potential to the base of the transistor 54 due to the small impedance across the transistor 52 when it is conducting. The base-emitter junction of the transistor 54 is sufficiently reverse biased to keep the transistor 54 from conducting, maintaining the indicator device 30' deenergized. When the probe 22' is no longer in contact with the conductive fluid 29', it presents an open circuit to the detector 10' and causes the base potential of the transistor 52 to become more positive than its emitter potential, extinguishing the base current in the transistor 52 and rendering it nonconductive. When the transistor 52 is turned off, the potential across the resistor 42' is lowered due to the increased potential drop across the transistor 52. This turns on the transistor 54 and energizes the indicator device 30'. The indicator device 30' may thus be held energized so long as the probe 22' is not immersed in the conductive fluid 29'.

As is the case in the circuit of FIG. 1, the timer circuit 16' in FIG. 2 provides a brief period upon initial energization of the detector 10' in which the indicator device 30' is energized upon initial energization of the detector 10' even though the probe 22' is immersed in the conductive fluid 29'. This is achieved by virtue of the low impedance presented to the detector 10' by the timer circuit 16' when the capacitor 48' is being charged. The low impedance of the timer circuit 16' provides a high voltage at the base of the transistor 52 sufficient to turn off the transistor 52 while the capacitor 48' is being charged. The turning off of the transistor 52 during this period renders the transistor 54 and the indicator device 30' conductive in the fashion previously described. The indicator device 30' is thus utilized to check the detector 10' operativeness in the fashion described in connection with FIG. 1 during a time determined by the capacitor 48' and the resistances in the probe circuit 12'. When the capacitor 48' has become charged the transistor 52 is rendered conductive due to the increased voltage drop across the timer circuit 16', turning off the transistor 54 and returning the detector 10' to normal operation.

The detector 10' in FIG. 2 may be utilized to intermittently energize the indicator device 30' by including the shunt resistor 56 in parallel with the probe 22'. Normally, when the conductive fluid 29' forms a short circuit across the terminals 26' and 28', the shunt resistor 56 has little effect on the detector 10'. However, when the conductive fluid 29' falls below the level of the probe 22', an open circuit exists between the terminals 26' and 28' so the high resistance of the shunt resistor 56 appears between the base of the transistor 52 and ground. The shunt resistor 56 does not allow sufficient base current to keep the transistor 52 conductive so the transistor 52 is rendered nonconductive, turning on the transistor 54 and the indicator device 30'. However, the capacitor 48' is able to charge through the shunt resistor 56, the resistor 24', and the resistor 46'. When the capacitor 48' becomes sufficiently charged the base-emitter junction of the transistor 52 is again forward biased, turning on the transistor 52 and turning off the transistor 54 and the indicator device 30'. When the transistor 52 is turned on it discharges the capacitor 48' through the resistor 46' until the transistor 52 is again rendered nonconductive. This whole sequence repeats itself, intermittently energizing the indicator device 30'.

The purpose of the diodes 58 and 60 will now be explained. The diode 58 is connected between the base and the emitter of the transistor 52 to provide temperature compensation. The diode 58 accomplishes this by reducing the base to emitter voltage across the transistor 52. The diode 60 is connected in the forward direction in the emitter circuit of the transistor 54 so as to reduce the collector leakage current of the transistor 54. The transistor 54 leakage current is thus kept to small to affect the readings of the indicator device 30'.

The fluid level detector 10" shown in FIG. 3 includes circuits similar to those present in the previously described embodiments. They are the probe circuit 12", the indicator circuit 14", and the timer circuit 16". The probe circuit 12' is in the form of a bridge comprised of a positive temperature coefficient thermistor probe 62, the resistance of which increases with a corresponding increase in temperature, and resistors 64, 66, and 68. When the probe 62 is immersed in a dense fluid, such as a liquid, it is kept cool by the rapid conduction of heat from the probe 62 to the liquid. However, when the liquid level is lowered sufficiently to uncover the probe 62, the temperature of the probe 62 rapidly increases due to its internal heating. The probe 62 resistance is thus increased, causing a current unbalance in the probe circuit 12". The current unbalance in the probe circuit 12' is sensed by the indicator circuit 14". The indicator circuit 14" is comprised of an NPN-transistor 70, a PNP-transistor 72, a current-limiting resistor 74, and the indicator device 30".

When the probe 62 is immersed in liquid it assumes a very low impedance. This keeps the emitter potential of the transistor 70 higher than its base potential and precludes the energization of the transistor 70. When the transistor 70 is turned off no base current exists for the transistor 72 so the transistor 72 is also turned off. However, when the probe 62 is above the liquid, it assumes very high impedance which greatly lowers the potential at the emitter of the transistor 70. The emitter potential of the transistor 70 falls to a level below the base potential of the transistor 70, rendering the transistor 70 conductive. When the transistor 70 is rendered conductive it draws current from the base of the transistor 72 through the current limiting resistor 74. This turns on the transistor 72 and energizes the indicator device 30" so as to provide a signal of the low liquid level. To facilitate rapid switching of the circuit, a regenerative feedback path is provided by a feedback impedance 76 connected between the collector of the transistor 72 and the base of the transistor 70. The regenerative feedback greatly increases the sensitivity of the indicator circuit 14" by causing the indicator device 30" to become fully energized when only a slight current unbalance has occurred in the probe circuit 12".

The timer circuit 16", comprised of the resistor 46" and capacitor 48", is connected between the switch 20" and the base of the transistor 70 so as to provide base current to the transistor 70 from the battery 18" upon closure of the switch 20". When the switch 20" is closed, the timer circuit 16" presents a low-impedance path to the base of the transistor 70, energizing the transistors 70 and 72 and the indicator device 30" as was previously described. The initial energization of the indicator device 30" upon closure of the switch 20" provides a check of the detector 10" operativeness. As the capacitor 48" becomes charged, the transistor 70 base current is controlled by the voltage divider action of the resistance 66 and 68, turning off the transistors 70 and 72 and the indicator device 30" after a time determined by the time constant of the timer circuit 16". After the capacitor 48" has become charged and the indicator device 30" extinguished, the detector 10" operates in the normal fashion earlier described.

While persons skilled in the art will realize different circuit elements may be utilized, the following elements have proven to be satisfactory when utilized in the embodiments herein discussed:

| Figure Shown | Identifying Number | Element Description |
| --- | --- | --- |

| | | |
|---|---|---|
| 1 | 24 | 4.7 kΩ |
| 1 | 30 | 1.5 Watt |
| 1 | 32 | Mullard ACY 21 |
| 1 | 42 | 47 Ω |
| 1 | 44 | 22 Ω |
| 1 | 46 | 220 Ω |
| 1 | 48 | 500 μf. |
| 2 | 24' | 47 kΩ |
| 2 | 30' | 4 Watts |
| 2 | 42' | 1 kΩ |
| 2 | 44' | 5 Ω |
| 2 | 46' | 220 Ω |
| 2 | 48' | 250 μf. |
| 2 | 52 | Mullard ACY 21 |
| 2 | 54 | Mullard ACY 21 |
| 2 | 56 | 100 kΩ |
| 3 | 46" | 1 kΩ |
| 3 | 48" | 1,000 μf. |
| 3 | 62 | STC PTC 120 |
| 3 | 64 | 6.8 Ω |
| 3 | 66 | 1.2 kΩ |
| 3 | 68 | 10 kΩ |
| 3 | 70 | Mullard BC 108 |
| 3 | 72 | Mullard BCY 72 |
| 3 | | 1 kΩ |
| 3 | 76 | 100 kΩ |

It is thus seen that a fluid level detector has been provided having a provision for checking the detector operativeness upon initial energization of the detector. In so doing, an RC timing circuit has been employed, the time constant of which has been utilized to establish the duration of the check of the detector operativeness. In addition, a fluid level detector of this type has been provided which may be adapted to provide intermittent flashes from an indicator device to call a low fluid level to the attention of an observer. A fluid level detector has also been provided which may be made very sensitive when utilized with probes of low sensitivity by the use of regenerative feedback.

While these advantages have been achieved by the detector embodiments herein discussed, it will be apparent to those skilled in the art that many variations of this invention may be devised. However, this invention is to be limited only by the following claims.

What is claimed is:

1. In a fluid level detector, the combination of a reservoir for fluid, an electrical power source, an indicator circuit including an indicator device and a current-responsive device connected to the power source, the current-responsive device when being operative to effect energization of the indicator device by the power source, a probe circuit including a probe in series with the power source and positioned in the reservoir at a fluid level to be detected, the probe circuit being connected to the current-responsive device and operative to control the energization thereof by the power source and accordingly the energization of the indicator device in response to the immersion of the probe in the fluid, and an RC timer circuit operative after the detector commences operation for causing the current-responsive device to effect energization of the indicator device for a predetermined time so as to provide a check of the detector operativeness.

2. In a fluid level detector, the combination of a reservoir for a conductive fluid, an electrical power source, a probe circuit including a probe for controlling current flow in the probe circuit, the probe being positioned in the reservoir so as to be immersed in the fluid when the fluid is at a certain level to be detected and being so constructed that the conductivity thereof is determined by the extent of immersion of the probe in the fluid, an indicator circuit including an indicator device and a transistor responsive to current flow in the probe circuit, the transistor being operative to control the energization of the indicator device in response to the conductivity of the probe so as to cause the indicator device to be energized when the probe is not immersed in the fluid, switch means selectively operable to connect the indicator and probe circuits to the power source so as to render the detector operative, and an RC timer circuit for rendering the transistor operative after the switch means is operated so as to energize the indicator device for a predetermined time as an indication of the detector operativeness.

3. In a fluid level detector, the combination of a reservoir for a conductive fluid, a probe circuit, an indicator circuit, an electrical power source, a switch selectively operable to connect the probe and indicator circuits to the power source, the probe circuit including a probe positioned in the fluid reservoir so as to be immersed in the fluid when the fluid is at a certain fluid level to be detected, the probe being operative to control current flow in the probe circuit in response to the extent of immersion thereof in the fluid, the indicator circuit including an indicator device and a transistor responsive to current flow in the probe circuit for controlling energization of the indicator device, the transistor being placed in a certain operative condition when the probe is not immersed in the fluid so as to energize the indicator device to provide an indication that the fluid in the reservoir is below the certain level, and a timer circuit including an RC network operative after the switch is operated to supply current to the transistor for a predetermined time effective to place the transistor in the certain operative condition so as to energize the indicator device for the predetermined time, thereby provide a check of the detector operativeness.

4. In a fluid level detector, the combination of a fluid reservoir; an indicator circuit comprised of a Schmitt trigger and an indicator device, the Schmitt trigger being operative in response to a trigger signal as to control the energization of the indicator device; a probe circuit comprised of a probe positioned in the reservoir at a fluid level to be detected, the probe circuit providing the trigger signal to the Schmitt trigger in response to the immersion of the probe so as to effect energization of the indicator device and provide an indication of the fluid level in response to immersion of the probe in the fluid; and a timer circuit adapted to effect energization of the indicator device for a predetermined time when the detector commences operation, thereby providing a check of the detector operativeness.

5. In a fluid level detector, the combination of a fluid reservoir; an indicator circuit comprised of a Schmitt trigger and an indicator device, the Schmitt trigger being operative in response to a voltage signal effective to control the energization of the indicator device; a probe circuit comprised of a probe positioned in the reservoir at a fluid level to be detected for generating the voltage signal; means connecting the probe circuit to the Schmitt trigger effective to control the energization of the indicator device in response to the immersion of the probe; a timer circuit including an RC network and operative in response to the detector commencing operation effective to energize the indicator device for a predetermined time when the detector commences operation, thereby providing a check of the detector operativeness; and a shunt resistor in parallel with the probe so as to provide a charging path to the RC network when the probe is not in the fluid whereby the Schmitt trigger is caused to intermittently effect energization of the indicator device so as to provide a periodic indication when the probe is not immersed in the fluid.

6. In a fluid level detector, the combination of a fluid reservoir; a probe circuit comprised of a thermistor probe positioned in the reservoir so as to be immersed in the fluid at a fluid level to be detected, the probe circuit providing a signal determined by the immersion of the probe in the fluid; an indicator circuit that is responsive to the signal provided by the probe circuit that is responsive to the signal provided by the probe circuit for providing an indication of the fluid level as determined by immersion of the probe in the fluid; and a timer circuit adapted to energize the indicator circuit for a predetermined time when the detector commences operation so as to provide a check of the detector operativeness.

7. In a fluid level detector, the combination of a fluid reservoir; a probe circuit comprised of a thermistor probe positioned in the reservoir so as to be immersed in the fluid at a fluid level to be detected, the probe circuit providing a signal determined by the immersion of the probe in the fluid; an indicator circuit responsive to the signal provided by the probe circuit so as to provide an indication of the fluid level in response to the immersion of the probe; regenerative feedback means combined with the indicator circuit so as to increase the sensitivity of the indicator circuit to the signal provided by the probe circuit; and a timer circuit adapted to energize the indicator circuit for a predetermined time when the detector commences operation, thereby providing a check of the detector operativeness.

8. In a fluid level detector, the combination of a fluid reservoir; a probe circuit comprised of a thermistor probe positioned in the reservoir so as to be immersed in the fluid at a fluid level to be detected, the probe circuit providing a signal determined by the immersion of the probe in the fluid; an indicator circuit including an indicator device and responsive to the signal provided by the probe circuit so as to provide an indication of the fluid level in response to the immersion of the probe; a feedback impedance adapted to combine a regenerative feedback signal from the indicator device with the signal provided by the probe circuit so as to increase the sensitivity of the indicator circuit; and a timer circuit adapted to energize the indicator circuit for a predetermined time when the detector commences operation so as to provide a check of the detector operativeness.

* * * * *

PO-1050
(5/69)

UNITED STATES PATENT OFFICE
CERTIFICATE OF CORRECTION

Patent No. 3,626,400        Dated December 7, 1971

Inventor(s) Trevor Bates

It is certified that error appears in the above-identified patent and that said Letters Patent are hereby corrected as shown below:

Column 3, line 5, "30', the" should read -- 30', and the --. Column 4, line 6, "kept to small" should read -- kept too small --. Column 4, lines 11 and 22, "12' " should be -- 12" --. Column 4, line 32, after "assumes" insert -- a --. Column 4, line 61, "sistance 66 and 68" should read -- sistors 66 and 68 --. Column 5, line 20, under "Identifying Number" insert -- 74 --. Column 5, line 46, "when being operative" should read -- when energized being operative --. Column 6, line 22, "provide" should be -- providing --. Column 6, line 27, after "signal" insert -- so --. Column 6, lines 63 and 64, after "probe circuit" delete "that is responsive to the signal provided by the probe circuit".

Signed and sealed this 11th day of July 1972.

(SEAL)
Attest:

EDWARD M. FLETCHER, JR.
Attesting Officer

ROBERT GOTTSCHALK
Commissioner of Patents